United States Patent
Ludwig et al.

(10) Patent No.: US 7,213,738 B2
(45) Date of Patent: May 8, 2007

(54) SELECTIVE WAVE SOLDER SYSTEM

(75) Inventors: Eric Ludwig, Camdenton, MO (US);
Keith Howell, Osage Beach, MO (US);
Troy Beard, Camdenton, MO (US)

(73) Assignee: Speedline Technologies, Inc., Franklin, MA (US)

( * ) Notice: Subject to any disclaimer, the term of this patent is extended or adjusted under 35 U.S.C. 154(b) by 224 days.

(21) Appl. No.: 10/260,980

(22) Filed: Sep. 30, 2002

(65) Prior Publication Data
US 2004/0060963 A1    Apr. 1, 2004

(51) Int. Cl.
*B23K 31/02* (2006.01)

(52) U.S. Cl. .......................... 228/103; 228/10; 228/37

(58) Field of Classification Search ............... 228/102, 228/260, 10, 11, 37
See application file for complete search history.

(56) References Cited

U.S. PATENT DOCUMENTS

| | | | | |
|---|---|---|---|---|
| 2,870,532 | A * | 1/1959 | Young ..................... | 228/180.1 |
| 4,890,781 | A * | 1/1990 | Johnson et al. ................. | 228/7 |
| 5,060,063 | A | 10/1991 | Freeman | |
| 5,123,154 | A * | 6/1992 | Maskens et al. ........... | 29/564.8 |
| 5,176,312 | A * | 1/1993 | Lowenthal ............... | 228/180.1 |
| 5,193,738 | A | 3/1993 | Hayes | |
| RE34,615 | E | 5/1994 | Freeman | |
| 5,415,337 | A * | 5/1995 | Hogan et al. ............... | 228/223 |
| 5,538,175 | A * | 7/1996 | Massini et al. ............. | 228/102 |
| 5,807,606 | A | 9/1998 | Mould et al. | |
| 5,831,247 | A | 11/1998 | Hidaka | |
| 5,866,950 | A * | 2/1999 | Iwasaki et al. ............. | 257/782 |
| 6,164,516 | A * | 12/2000 | Watanabe et al. ............. | 228/37 |
| 6,293,007 | B1 * | 9/2001 | Kuriyama et al. ............ | 29/840 |
| 6,317,973 | B1 * | 11/2001 | Kuriyama et al. ............ | 29/840 |
| 6,415,972 | B1 * | 7/2002 | Leap .......................... | 228/102 |
| 6,510,724 | B1 * | 1/2003 | Weiss et al. ................. | 73/1.01 |
| 6,726,083 | B2 * | 4/2004 | Leap .......................... | 228/102 |
| 2001/0032869 | A1 * | 10/2001 | Ichikawa et al. ........... | 228/102 |

FOREIGN PATENT DOCUMENTS

| EP | 1 193 018 A2 | 4/2002 |
|---|---|---|
| WO | WO 00/67005 | 11/2000 |

OTHER PUBLICATIONS

International Search Reported mailed Mar. 26, 2003, PCT/US03/30954, Speedline Technologies, Inc.

* cited by examiner

*Primary Examiner*—Jonathan Johnson
(74) *Attorney, Agent, or Firm*—Lowrie, Lando & Anastasi, LLP

(57) ABSTRACT

The present invention relates to a selective wave solder machine. In particular, it relates to a system for calibrating and adjusting process points to account for variations in machines and circuit boards. Vision systems are used to locate fiducials on the processing modules and the circuit boards. Differences between stored locations for fiducials relating to the circuit board and the processing modules are used to adjust the positions of stored process points to achieve improved performance.

12 Claims, 3 Drawing Sheets

SELECTIVE WAVE SOLDER SYSTEM

BACKGROUND OF THE INVENTION

1. Field of the Invention

The present invention relates to a system and method for calibration, set-up, and control of a selective wave solder system. More particularly, it relates to a system and method for accounting for positioning errors in the board and/or the system in during processing.

2. Discussion of Related Art

Many electronic devices use a circuit board as the foundation building block for the electronic circuitry which forms the device. With the advent of the printed circuit board (PCB), the board itself actually became part of the circuit, forming conductors for the electrical current between the various electronic components. The circuit board both supports the electronic components and links them together. Generally, the circuit board consists of a nonconductive base, such as fiberglass, coated with a thin layer of a conductor, such as copper, which is etched to form a pattern of electrical conductors. Components are then soldered to the circuit board. Soldering of the various components to a circuit board has generally been accomplished by using various techniques, such as: manual soldering, reflow soldering, batch soldering using a solder pot or continuous soldering using a wave soldering machine.

Wave soldering has long been the soldering method of choice for high production circuit boards which require through-hole parts. This is a continuous process in which circuit boards are passed over a wave of molten solder. The solder wets up through metal plated holes containing the component leads to consummate the soldering process. This process lends itself to automation, as the parts are simply loaded onto a conveyor which in turn passes the parts over a wide wave of solder. Advances in PCB technology, such as double-sided boards and mixed technology assemblies have allowed intricate and complex circuits to be implemented in a smaller footprint. However, these advances limit the feasibility of using historic wave soldering techniques.

The selective wave solder system was developed to achieve advantages of wave soldering on through-hole components in connection with complex circuit board assemblies. In one particular style of selective wave solder device, a circuit board is moved, using a gantry system, to different locations for processing. Flux and solder may be placed on discrete portions of the circuit board. Typically, the process points are selected through a teaching process. Using a manual control system, one moves the gantry with the circuit board through the system and identifies particular process points. The process points, identified as x, y and z values within the gantry system, are stored for automated processing. Furthermore, the file with the process points can be transferred and utilized on another selective wave solder machine for processing the same boards. In this manner, the processing of each board need only be entered once, independent of the number of production lines and selective wave soldering machines utilized in processing boards. During automated production, the gantry system will move to each of the stored process points and the pre-programmed action will be conducted.

However, often minor positional or rotational errors occur with the gantry system or placement of the circuit board. Circuit boards also have some variation in their fabrication which results in positional variations. Additionally, different machines may have variations in the placement of the modules or stations, which can results in positional errors. Variations within a machine may also occur upon servicing. These positional errors result in defects due misalignment of the process points and the work area on the circuit board. Therefore, a need exists for a system which can correct for variations in positioning of process points on a circuit board attached to the gantry system. A need also exists for a system which can correct for variations in the placements of processing devices.

Furthermore, circuit boards can sag or bow across the span of the board. This is particularly prevalent in large circuit boards with many components. The height of the solder wave may also vary over time due to variations in pump speed, solder levels, and environmental factors. The variations in board height, from sagging or bowing, and solder wave height can lead to defects. The relationship between the board height and the wave height determines the contact area, depth, and time of the solder operation. A board which is too high relative to the solder wave may result in incomplete solder joints. A board which is too low can become excessively hot, warp or destroy components. Therefore, a need exists for a system which can determine and correct for variations in board and solder wave height.

SUMMARY OF THE PRESENT INVENTION

The present invention substantially overcomes the deficiencies of the prior art in utilizing one or more vision systems to determine and correct for positional defects in a selective wave solder machine. A microprocessor uses the images from at least one of the cameras of the vision systems to determine the variations in the position of the circuit board. One or more fiducials on the circuit board are identified to the system when the processing program is stored. The fiducials may be created on the circuit board especially for this purpose or an existing characteristic of the board may be used. During automated processing, the fiducials on the circuit board are located by the vision system. The x,y position of the fiducials with respect to the gantry system are determined and compared to the stored fiducial positions. Then, the system adjusts the process points (utilizing translational, rotational, and stretch/shrinkage error correction) in the program based upon the variations between the expected and actual positions of the fiducials.

According to another aspect of the invention, the system utilizes a vision system to calibrate the position of processing modules in a selective wave soldering system. A camera is positioned on a gantry system. A microprocessor uses the images from the camera to determine variations in the position of processing modules. At least one fiducial is identified for each processing module. A special fiducial mark on the processing module may be used. Alternatively, a unique part of the processing module may function as the fiducial. The system locates the fiducials for each of the processing modules and stores the positions. The position information for the processing modules are used to adjust the process points for any board to be processed on that machine. Additionally, by using known fiducials on the machine, the theta rotation can be calibrated. The fiducials can be automatically found by simply starting the calibration routine.

According to another aspect of the invention, the system utilizes the vision system to calibrate rotational motion of the gantry. The gantry in the selective wave soldering system of the present invention is moveable in x, y, z, and theta. Due to manufacturing tolerances, the rotational point (i.e. the center of rotation) for the theta motion may vary from machine to machine. The present invention uses fiducials having known positions. The vision system is used to determine the location of two fiducials. Following a known rotation of the gantry, the positions of the fiducials are determined. The change in position of the fiducials are used to determine the point of rotation of the gantry. According to another aspect of the invention, with a precise determination of the point of rotation, the circuit board can be processed in rotated positions. Once process points have been stored, the circuit board can be processed at a different rotated position without having to relocate the fiducials.

According to another aspect of the invention, the height of the board and the position of the gantry in the z direction can be determined. A contact or non-contact sensor is positioned as a module in the selective wave soldering machine. The sensor is operated as a process point in the process program. When operated, the sensor determines the height of the circuit board at a specified location. The system also includes a sensor for determining the height of the wave. The distance between the height of the wave and the bottom of the circuit board can be adjusted, through control of the wave or through control of the gantry to achieve optimum solder performance. Since the board height sensor is a module in the system, the height of the board can be determined at different locations to adjust for board bow or sag, or to automatically control boards of different thicknesses.

BRIEF DESCRIPTIONS OF THE DRAWINGS

DETAILED DESCRIPTION

Figure 1:
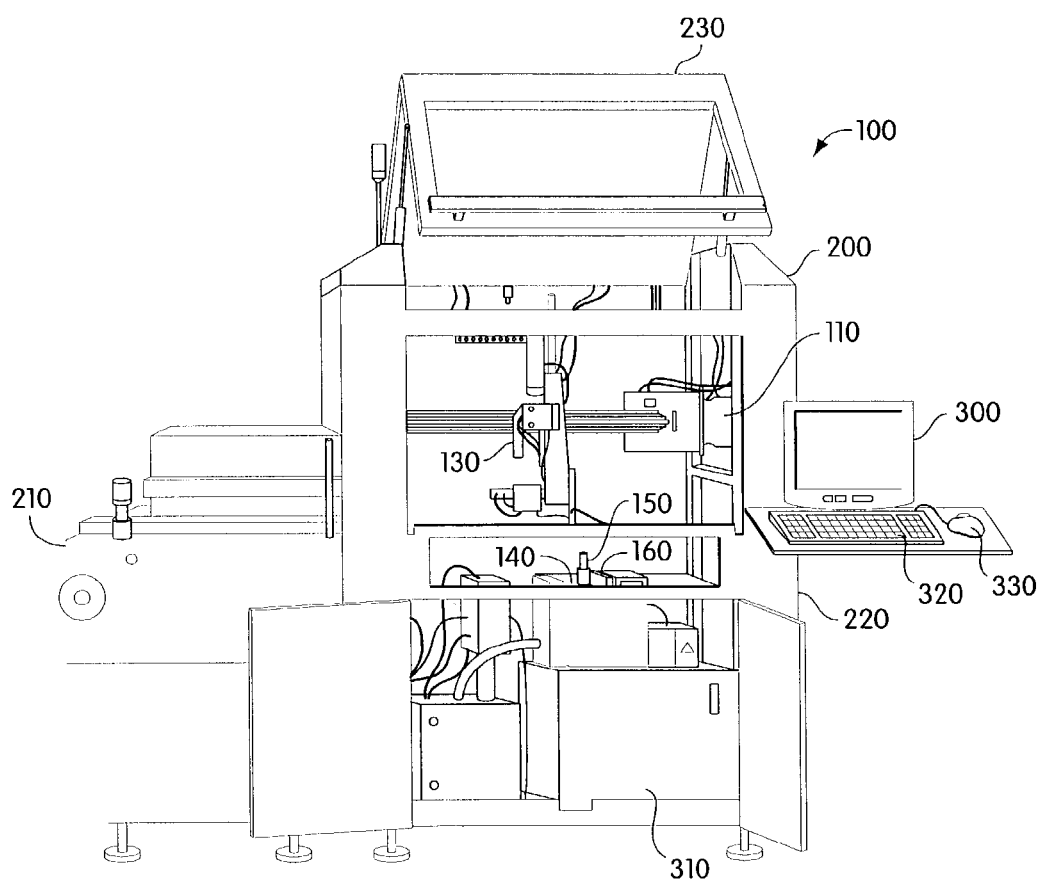
FIG. 1 is a front view of a selective wave solder machine incorporating an embodiment of the present invention with the covers opened.
Figure 2:
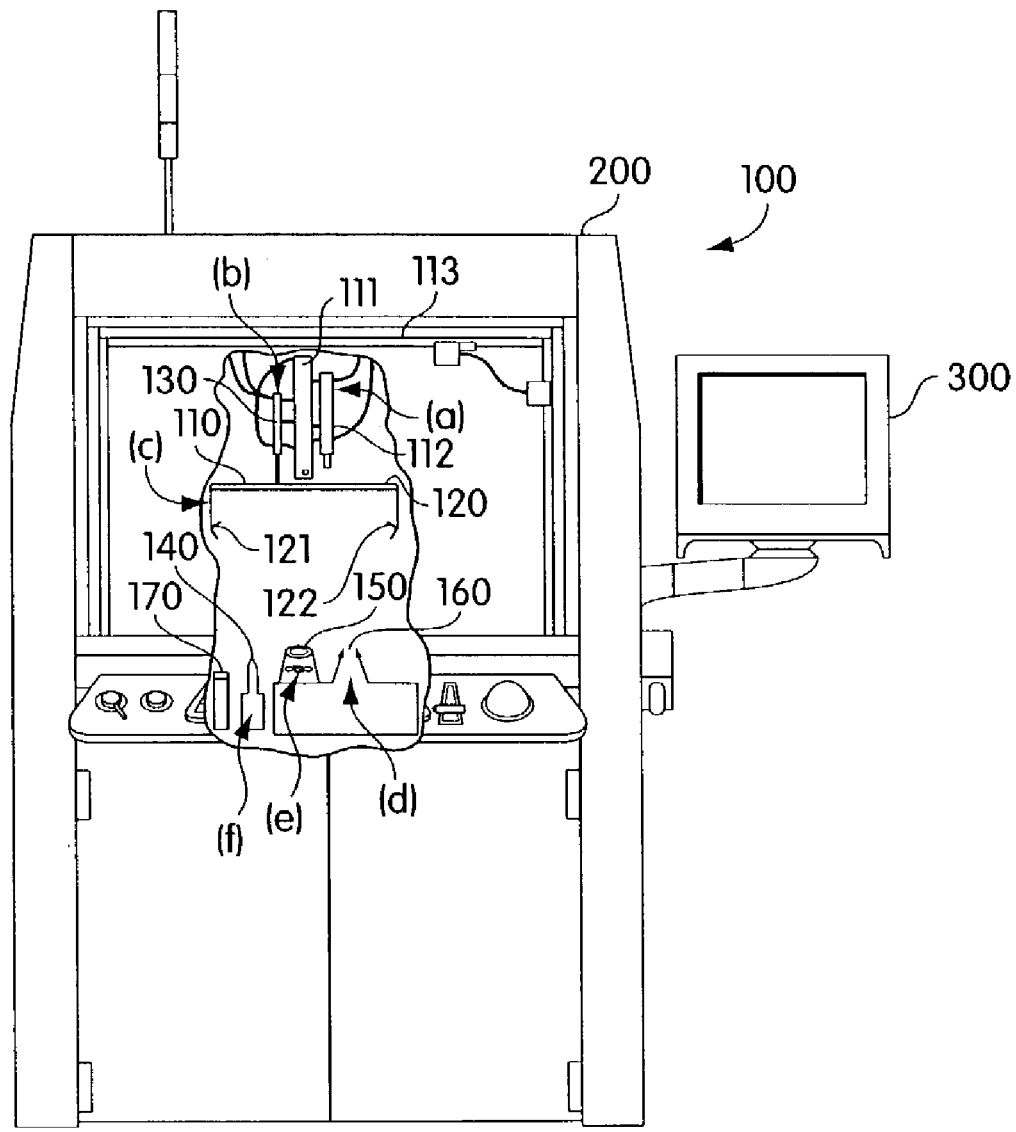
FIG. 2 is an illustration of the components of a selective wave solder machine incorporating an embodiment of the present invention.
Figure 3A:
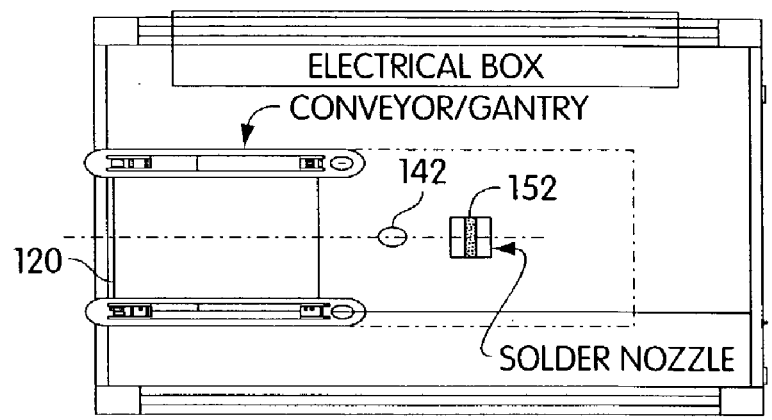
FIG. 3A is a top view of selected components of a selective wave solder machine incorporating an embodiment of the present invention.
Figure 3B:
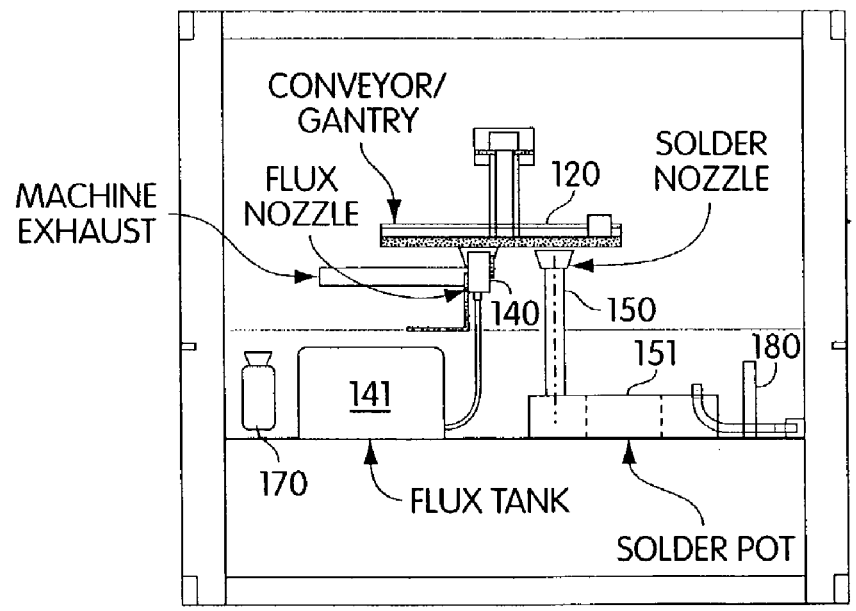
FIG. 3B is a side view of selected components of a selective wave solder machine incorporating an embodiment of the present invention.

FIG. 1 illustrates a selective wave solder machine 100 incorporating the present invention. FIG. 2 illustrates various components within the wave solder machine 100. FIGS. 3A and 3B further illustrate components in the wave solder machine. The wave solder machine 100 includes a gantry system 110 for moving a circuit board within the machine. The gantry system 110 is controllable for motion in x, y, z and theta. The gantry system 110, includes a circuit board support 120 with attachments 121, 122 for the sides of the circuit board. Alternatively, the attachments 121, 122 may connect to a jig, support, or other device holding the circuit board. The attachments are designed to mate with an input and an output of the machine to allow circuit boards to be automatically loaded and discharged from the machine. The gantry system 110 includes a translation control system 113 for moving the gantry known distances in the x and y directions. A height controller 111 controls motion of the gantry in the z dimension. A rotational control 112 is used to rotate the gantry in theta. All of the controllers operate to precisely position a circuit board with the selective wave solder machine 100. According to an embodiment of the invention, the circuit board support 120 can hold circuit boards, or multiple boards, up to fourteen inches square. The gantry system 110 can move the circuit board to allow processing by a processing module with respect to any part of the circuit board. The gantry system 110 is controlled by a microprocessor system 310 in the machine 100. A monitor 300 is used to view and control operation. A keyboard, 320, mouse 330 or other input devices can be used for control purposes.

Process modules are located in the selective wave solder machine 100 below the gantry system 110. In an embodiment of the present invention, the processing modules include a flux system 140, a solder system 150, and an air knife system 160, and the possibility of a teach camera, a calibration camera, and a Z sense module. The solder system 150 includes a solder pot and a solder nozzle 152. A pump (not shown) forces the solder from the solder pot 151 to the nozzle 152 and creates a solder wave at the nozzle 152. Different solder nozzles 152 can be used which have different characteristics. Generally, according to embodiments of the present invention, solder nozzles 152 are used to create solder waves from 3 millimeters to 12 millimeters wide. The flux system 140 includes a flux tank 141 and the flux nozzle 142. The flux system is used to place flux on circuit board prior to the solder operation in order to create a good solder bond. According to an embodiment of the invention, the flux nozzle 142 is approximately one inch in diameter. The air knife system 160 is supplies a thin line of heated air, approximately ½ inch in length, to the bottom of the circuit board. The air knife system 160 is used to eliminate solder bridges that can form during the solder operation.

The gantry system and processing modules discussed above are typical for a selective wave solder machine. In many conditions, the machine 100 operates in a typical manner. An operator creates a process program for a circuit board by manually moving the board over the teach camera 170 and viewing specific points. The operator then programs the function needed at that location. These "taught" loactions (using the teach camera 170) become known as the process points. The process points represent specific x, y, z, theta and time values for the gantry system. The process points are then stored as the process program. Once stored, the process program operates to process a circuit board using these points and the known coordinates of each of the modules. The process program can be transferred to another machine or retrieved at a later time to process the same board. During operation, a circuit board is loaded from an input station 210 (or hand loaded) into the attachments 121, 122 of the circuit board support 120 of the gantry system 110. Known systems for operating the input station 210 and loading of the circuit board may be used with the present invention. The gantry system 110 proceeds to move to each of the process points to the pre-programmed module location and performs the programmed operation dictated by the process program. The circuit board can be processed using any of the processing modules in any order as desired by the operator. When the process points have all been completed, the circuit board is off loaded to an output section 220. Alternatively, the input section 210 could also be used to off load circuit boards. Once the circuit board has been off loaded, the system loads the next circuit board for processing.

An embodiment of the present invention provides an autocalibration process for determining the locations of the processing modules. The gantry system 110 includes a camera 130. During the autocalibration process, the gantry system moves to an expected location of a processing module. The camera is activated to capture a picture of the location. The picture is then processed to locate a fiducial corresponding to the processing module. The fiducial may be created on the processing module expressly for the calibration process. Alternatively, the fiducial may be any recognizable feature on the processing module. For example, a corner of the solder nozzle may be the fiducial. A file is stored with the feature of the fiducial for each processing module. Known techniques are used to locate the fiducial in the picture taken by the camera. Such techniques may include processing the picture or moving the camera to locate the fiducial within desired parameters. The gantry system moves to and locates each of the processing modules in the selective wave solder machine. The x, y position of each module is stored in the memory of the microprocessor 310. As previously mentioned, the teach camera 170 identified the process points on the board (relative to the position of the teach camera itself). Given the process point location relative to the camera (taught by the operator), and the module locations relative to the camera (produced through the autocalibration sequence), the microprocessor 310 can determine the necessary movement of the gantry 110 so that the process points are properly aligned to the modules. In this manner, the selective wave solder machine 100 of the present invention can compensate for movements of the modules during servicing or discrepancies in placement of modules on different machines.

According to another embodiment of the present invention, the present invention provides an autocalibration process for rotational movement. The camera 170 is positioned below the gantry system. The camera 170 is used to locate fiducials associated with the gantry system. The fiducials may be located on the circuit board support 120 or on a circuit board which is properly positioned in the circuit board support. The process for locating fiducials with the camera 170 is similar to that for the aforementioned camera 130. The gantry system 110 is moved to an expected location of the fiducial. The camera 170 is activated to store an image. The image is then processed by the microprocessor 310 to locate the fiducial. A previously stored file with a picture of the fiducial is compared to the image to locate the fiducial using known techniques. The first step is to align two fiducials with one of the axes of movement. According to an embodiment, two fiducials are used which need to be parallel to the x axis of movement. The fiducicals are located. If the y position of the fiducials are not the same, the gantry system is rotated to move the fiducials by a known rotational distance defined by the algorithm contained within the microprocessor 310. The embodiment of the invention dictates that only one location and rotation sequence is needed to properly align the Theta axis. Optionally, the operator can perform the autocalibration of the Theta axis a second time to insure accuracy and repeatability. The rotational position is then stored as the zero or reference position for the theta dimension. Once the reference theta position is determined, the center of rotation for the gantry system can be determined. The gantry is rotated a known distance. The two fiducials are then located again. Using the known angle of rotation and the location of the two fiducials, the center of rotation for the gantry system can be determined automatically using an algorithm contained in the microprocessor 310.

According to another embodiment of the present invention, the selective wave solder machine adjusts the position points for variations in board positioning and size. In addition the process points, one or two fiducial points are stored with respect to a circuit board. During operation the fiducials are located using the camera 170 below the gantry. The process for locating the fiducials is the same as that described above. The fiducials are located each time a new circuit board is loaded on the gantry system. All of the process points are adjusted based upon the located fiducials prior to processing of the circuit board. The adjusted process points are used to provide more accurate operation on the circuit board.

If one fiducial is used, then adjustments are made in the x and y dimensions. The differences between the actual fiducial location, in x and y, and the stored fiducial location are used to translate the position of each process point. In this manner, the system adjusts for variations in positioning of the circuit board on the gantry system 110. Of course, other adjustments to the process points may also be made by the system to account for calibration of the module locations.

If two fiducials are used, then adjustments can be made for stretch/shrink and rotation as well as translational errors. Three offsets are calculated for each process point based upon the actual and stored positions of the two fiducials. The three offsets are combined for each process point to determine the actual process points for the circuit board.

The first offset accounts for translational errors. This offset is the same for every process point in the process program. To determine translational errors, one of the fiducials is used as a reference point. The differences, in x and y dimensions, between the actual and stored positions of the first fiducial are used as the first offset to adjust the process points, as when only one fiducial is used.

The second offset determines adjustments for rotational errors. The differences between the actual and stored positions of the fiducials are used to determine an angular difference. An angle is determined based upon the difference, in x and y dimensions, between the two stored fiducials. A second angle is determined based upon the different, in x and y dimensions, between the two actual fiducials. The rotational error is defined as the difference between the first and second angles. A second offset is calculated for each process point using the rotational error. The second offset is determined by assuming that the distance between a process point and the reference point, i.e., the first fiducial, does not change. An offset, in both x and y dimensions, is determined for a process point by applying the rotational error determined from the fiducials to the angle between the reference point and the process point, while maintaining the distance between the points.

The third offset determines an adjustment due to stretching or shrinking of the circuit board. A ratio is determined between the vector distance of the actual fiducial locations and the vector distance of the stored fiducial locations. The determined ratio is used to determine an offset for each of the process points. To determine the offset, the angle between the stored process point and the stored reference point is assumed to be unchanged in the actual board. Assuming an unchanged angle, the previously determined ratio is applied to the vector distance between each process point and the reference point.

Once all of the offsets are determined, they are combined to create a final offset amount, in the x and y dimensions. The final offset amount is used to correct the position of each of the process points. Once the correct positions are determined, the process program is initiated to process the circuit board. New offsets and process points are calculated with respect to each new circuit board.

According to another embodiment of the invention, the board can be processed at any angle without the need to relocate the fiducials. All of the process points are taught at specific angles. Any angle can be used for a process point and different angles may be used for different process points. However, according to the above embodiment, the fiducials are located and offsets determined when the circuit board is at a zero position. When the circuit board is rotated, the offsets due to position or dimension errors of the circuit board need to be adjusted for the new location of the fiducials. The present invention does not require relocating the fiducials to determine the offsets. Using the known center of rotation, a new location for the first fiducial, which functions as the reference point, is determined for the rotated position of the circuit board. The new position for the reference point is used to determine the offsets for the process points at that rotated position. The process for determining the offsets is the same as described above. Thus, a new fiducial location is determined for each rotation of the circuit board. The new fiducial location is used to determine the offsets for the process points taught at that rotation.

According to another embodiment of the invention, the processing height of the circuit board is determined and adjusted. Sagging and bowing can result in variations in circuit board height. Such variations can cause difficulties with the soldering process. A height sensor 180, located as a module below the gantry system 110, is used to determine the height of the circuit board. Another sensor (not shown) is used to determine the height of the solder wave. By accurately determining the height of the circuit board and the solder wave, adjustments can be made to optimize performance of the solder operation. Optimal, or merely acceptable, characteristics for a solder joint can be determined. These characteristics are achieved by adjusting either the processing height of the gantry or the height of the wave.

Having described at least one embodiment, additional modifications and alterations will be apparent to those of ordinary skill in the art. Such modifications and alterations are considered part of the present invention. The present invention is only limited as set forth in the accompanying claims.

What is claimed is:

1. A selective wave solder system comprising:
   a plurality of processing modules for processing a circuit board;
   a process program identifying a sequence of a plurality of process points on a circuit board and one of a plurality of processing modules corresponding to each process point;
   a gantry system moving a circuit board to align each process point, in sequence, with the corresponding processing module;
   a process point adjustment mechanism for adjusting the process points, the process point adjustment mechanism including
      a memory storing a stored location of at least one fiducial,
      a vision system for capturing at least one image of at least one portion of a circuit board,
      location determining means for determining an actual location for the at least one fiducial based upon the at least one image, and
      offset means for determining at least one offset value for each of the process points based upon the stored location and the actual location of the at least one fiducial, the offset means determining the offset value based upon a difference, in x and y dimensions, between the actual location and stored location of the one fiducial wherein the memory stores a stored location of two fiducials; and
   wherein the offset means includes:
   means for determining a rotation offset;
   means for determining a dimension offset; and
   means for determining the offset value by combining a translation offset based on the difference in x and y dimensions, the rotation offset and the dimension offset.

2. The wave solder system according to claim 1, wherein means for determining a rotation offset includes:
   means for determining a stored angle between the stored locations of the fiducials;
   means for determining an actual angle between the actual locations of the fiducials;
   means for determining a rotation error as the difference between the stored angle and the actual angle; and
   means for determining a rotational offset for each process point based upon the rotation error and a distance between each process point and the stored location of one of the fiducials.

3. The wave solder system according to claim 1, wherein the means for determining a dimension offset includes:
   means for determining a ratio between a vector distance of the stored location of the fiducials and a vector distance of the actual location of the fiducials; and
   means for determining a dimensional offset for each process point based upon the ratio and a vector distance between the process point and the stored location of one of the fiducials.

4. The wave solder system according to claim 1, wherein at least one process point corresponds to a rotational position of the gantry; and
   wherein the offset means includes:
   means for determining an adjusted actual position of the at least one fiducial based upon the actual position of the at least one fiducial and the rotational position of the gantry; and
   means for determining the at least one offset value based upon the process points and the adjusted actual position of the at least one fiducial.

5. A selective wave solder system comprising:
   a plurality of processing modules for processing a circuit board;
   a process program identifying a sequence of a plurality of process points on a circuit board and one of the plurality of processing modules corresponding to each process point;
   a gantry system moving a circuit board to align each process point, in sequence, with the corresponding processing module;
   a calibration system, the calibration system comprising
      a vision system attached to the gantry system for capturing at least one image of at least one portion of the plurality of processing modules, and
      process module locating means for determining a location of each of the processing modules based upon the at least one image; and
   a rotational calibration system including
      two fiducials at known locations relative to the gantry system,
      a vision system for capturing at least one image of the two fiducials,
      means for determining the location of the two fiducials based upon the at least one image, and
      means for determining a rotation of the gantry system to align the two fiducials to a reference angle.

6. The selective wave solder system according to claim 5, further comprising a plurality of fiducials, each fiducial associated with one of the plurality of processing modules; and
 wherein the process module locating means includes means for locating each of the plurality of fiducials in the at least one image.

7. The selective wave solder system according to claim 5, wherein the gantry system moves to align the process point with the location of the corresponding processing module determined by the calibration system.

8. The selective wave solder system according to claim 5, further comprising a teaching system, the teaching system comprising:
 a vision system for displaying to a user at least a portion of a circuit board;
 a control system for moving the gantry system over the vision system; and
 process point entry means for storing a process point and corresponding process module when a process point is displayed on a predetermined portion of the vision system.

9. The selective wave solder system according to claim 5, wherein the rotational calibration system further includes:
 means for rotating the gantry system a known distance;
 means for determining the location of the two fiducials based upon the at least one image following rotation of the gantry system; and
 means for determining a center of rotation based upon a difference in position between the locations of the fiducials before and after rotation of the gantry system.

10. A wave solder system comprising:
 at least one processing module to perform a procedure on a circuit board;
 a gantry system to move at least one of a circuit board and the at least one processing module to align a process point of the printed circuit board with the at least one processing module; and
 a process point adjustment mechanism to adjust the process point, the process point adjustment mechanism including
  a vision system to capture at least one image of at least one portion of a circuit board to include an actual location of at least one fiducial,
  a control system to determine an actual location for the at least one fiducial based upon the at least one image, to determine at least one offset value for the process point based upon the stored location and the actual location of the at least one fiducial, and to control the gantry system to adjust the process point, the control system comprising a translation control system to determine a translational offset value based upon a difference, in x and y dimensions, between the actual location and stored location of the one fiducial, and
  a rotational control system to determine a rotational offset value, wherein the one offset value is determined by combining the translational offset value and the rotational offset value, the rotational control system including:
   means for determining a stored angle between the stored location of the fiducial;
   means for determining an actual angle between the actual location of the fiducial;
   means for determining a rotation error as the difference between the stored angle and the actual angle; and
   means for determining a rotational offset for each process point based upon the rotation error and a distance between each process point and the stored location of the fiducial.

11. A wave solder system comprising:
 at least one processing module to perform a procedure on a circuit board;
 a gantry system to move at least one of a circuit board and the at least one processing module to align a process point of the printed circuit board with the at least one processing module; and
 a process point adjustment mechanism to adjust the process point, the process point adjustment mechanism including
  a vision system to capture at least one image of at least one portion of a circuit board to include an actual location of at least one fiducial, and
  a control system to determine an actual location for the at least one fiducial based upon the at least one image, to determine at least one offset value for the process point based upon the stored location and the actual location of the at least one fiducial, and to control the gantry system to adjust the process point, the control system including:
   means for determining a ratio between a vector distance of the stored location of the fiducial and a vector distance of the actual location of the fiducial; and
   means for determining a dimensional offset for each process point based upon the ratio and a vector distance between the process point and the stored location of the fiducial.

12. A wave solder system comprising:
 at least one processing module to perform a procedure on a circuit board;
 a gantry system to move at least one of a circuit board and the at least one processing module to align a process point of the printed circuit board with the at least one processing module; and
 a process point adjustment mechanism to adjust the process point, the process point adjustment mechanism including
  a vision system to capture at least one image of at least one portion of a circuit board to include an actual location of at least one fiducial, and
  a control system to determine an actual location for the at least one fiducial based upon the at least one image, to determine at least one offset value for the process point based upon the stored location and the actual location of the at least one fiducial, and to control the gantry system to adjust the process point,
 wherein at least one process point corresponds to a rotational position of the gantry; and
 wherein the control system includes:
  means for determining an adjusted actual position of the at least one fiducial based upon the actual position of the at least one fiducial and the
 rotational position of the gantry; and means for determining the at least one offset value based upon the process points and the adjusted actual position of the at least one fiducial.

* * * * *